(12) United States Patent
Cook

(10) Patent No.: US 7,499,617 B2
(45) Date of Patent: Mar. 3, 2009

(54) METHOD AND APPARATUS FOR DISPOSING WATER ABSORBENT MATERIAL IN A FIBER OPTIC CABLE

(75) Inventor: Thomas C. Cook, Woodstock, GA (US)

(73) Assignee: Superior Essex Communications LP, Atlanta, GA (US)

( * ) Notice: Subject to any disclaimer, the term of this patent is extended or adjusted under 35 U.S.C. 154(b) by 0 days.

(21) Appl. No.: 11/710,380

(22) Filed: Feb. 23, 2007

(65) Prior Publication Data

US 2008/0205828 A1    Aug. 28, 2008

(51) Int. Cl.
*G02B 6/44* (2006.01)
(52) U.S. Cl. .................................. 385/100; 385/109
(58) Field of Classification Search .............. None
See application file for complete search history.

(56) References Cited

U.S. PATENT DOCUMENTS 5,698,615 A * 12/1997 Polle .................... 523/173

* cited by examiner

*Primary Examiner*—Sung H Pak
(74) *Attorney, Agent, or Firm*—King & Spalding LLP (57) ABSTRACT

A fiber optic cable can comprise spheres or balls that are coated with a water absorbent material, such as a super absorbent polymer ("SAP"). The spheres can provide clean and efficient carriers for introducing SAP into the cable during manufacturing. The spheres can have a diameter in a range of 20 microns to 2.5 millimeters and can be disposed in the cable's interstitial spaces, for example between the cable's optical fibers and a surrounding buffer tube. The SAP material can adhere to the spheres as a cross-linked coating or via electrostatic charge, for example. Beyond absorbing any water that may enter the cable, the spheres can provide cushioning or mechanical protection for the optical fibers. When the cable receives stress, motion among the spheres can absorb the stress to shield the fibers from damage.

35 Claims, 9 Drawing Sheets

METHOD AND APPARATUS FOR DISPOSING WATER ABSORBENT MATERIAL IN A FIBER OPTIC CABLE

CROSS REFERENCE TO RELATED APPLICATIONS

This patent application is related to the patent application entitled "Method and Apparatus for Protecting Optical Fibers of a Cable," to Thomas C. Cook, and assigned U.S. patent application Ser. No. 11/710,128, which is filed concurrently with the present application and which has been commonly assigned, the entire contents of which are hereby incorporated herein by reference.

This patent application is also related to the patent application entitled "Fiber Optic Cable Comprising Improved Filling Material and Method of Fabrication," to Thomas C. Cook, and assigned U.S. patent application Ser. No. 11/710,129, which is filed concurrently with the present application and which has been commonly assigned, the entire contents of which are hereby incorporated herein by reference.

FIELD OF THE INVENTION

The present invention relates to placing material in a fiber optic cable that protects the cable's optical fibers from stress and moisture and more specifically to disposing within the cable spherical-shaped particles that are coated with a water-absorbent agent.

BACKGROUND

Fiber optic cables include one or more optical fibers or other optical waveguides that conduct optical signals, for example carrying voice, data, video, or other information. In a typical cable arrangement, optical fibers are placed in a tubular assembly. A tube may be disposed inside an outer jacket or may form the outer jacket. In either case, the tube typically provides at least some level of protection for the fibers contained therein.

Optical fibers are ordinarily susceptible to damage from water and physical stress. Without an adequate barrier, moisture may gradually migrate into a fiber optic cable and weaken or destroy the cable's optical fibers. Without sufficient physical protection, stress or shock associated with handling the fiber optic cable may transfer to the optical fibers, causing breakage or stress-induced signal attenuation.

One conventional technique for protecting the optical fibers from damage is to fill the cable with a fluid, a gel, a grease, or a thixotropic material that strives to block moisture incursion and to absorb mechanical shock. Such fluids and gels are typically messy and difficult to process, not only in a manufacturing environment but also during field service operations. Field personnel often perform intricate and expensive procedures to clean these conventional materials from the optical fibers to prepare the fiber for splicing, termination, or some other procedure. Any residual gel or fluid can render the splice or termination inoperably defective, for example compromising physical or optical performance.

Another conventional technology for protecting optical fibers entails including a water absorbent chemical within the cable. The chemical absorbs water that inadvertently migrates into the cable, to help prevent the water from interacting with the delicate optical fibers. In one conventional approach, particles of the water absorbent chemical are mixed with the gel discussed above, and the mixture is inserted into the cable. This approach typically suffers from the same drawbacks as using a pure form of a gel; gels and related materials are messy and difficult to process. In another conventional approach, the chemical is applied to the surface of a tape that is inserted in the cable lengthwise. One disadvantage of the tape approach is that the tape typically offers the optical fibers a less than desirable level of cushioning against shock and other forms of physical stress.

Accordingly, to address these representative deficiencies in the art, what is needed is an improved capability for protecting an optical fiber from water damage. Another need exists for protecting an optical fiber from stress or physical damage. Still another need exists for a dry material that can be readily and cleanly disposed in a fiber optic cable to help shield the cable's fibers from physical and/or moisture attack. Yet another need exists for an apparatus that can be inserted in a fiber optic cable to protect the cable's optical fibers, yet that can be removed easily from the cable without leaving a problematic residue or a layer of fluid or gel. One more need exists for a technology that can efficiently carry moisture absorbent material in a dry state into a fiber optic cable. Further need exists for a process to fabricate protective materials and for a process to manufacture fiber optic cables that incorporate such protective materials. A capability addressing one or more of these needs would decrease the cost of making and using fiber optic cabling systems and would promote adoption of optical fibers for communications and other applications.

SUMMARY

The present invention can support protecting an optical fiber from contact with water, moisture, or humidity that might otherwise damage the optical fiber.

In one aspect of the present invention, a system that is disposed in a fiber optic cable along with at least one optical fiber can afford the optical fiber at least some level of protection. The protection can comprise, cushioning, stabilization, or protection from water, moisture, humidity, or chemical attack, to name a few possibilities. The system can comprise an apparatus, a device, a composition, or a material. More specifically, the system can comprise two or more objects that are ball-shaped. That is, the objects can be egg-shaped, peanut-shaped, bulbous, ovaloid, ovoid, rotund, spherical, globaI, round, etc. The optical fiber and the ball-shaped objects can be in contact with one another, can be adjacent one another, or can be separated from one another by one or more elements, such as a buffer tube wall, a tape, or some other item. Each of the ball-shaped objects can comprise an exterior surface that encloses or otherwise surrounds an interior region. Each object can further comprise a material, agent, chemical, or substance that absorbs water to help protect the optical fiber from water. The water can be water vapor, gaseous water, or liquid water, for example. The absorption of water can comprise physical or chemical absorption, binding, one or more chemical reactions, adsorption, a material expansion of the material, or some other beneficial interaction, to name a few possibilities. The water-absorbing material can adhere to or be attached to the exterior surface, either directly or via some intermediary, such as glue, cement, or binding agent. The absorbing material can comprise a powder that is attached to the exterior surface, a film, a coating, or some other material configuration or form. Moreover, the absorbing material can fully cover the exterior surface, thus providing a skin or a shell with a second exterior surface.

The discussion of protecting optical fibers presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Many aspects of the invention can be better understood with reference to the above drawings. The elements and features shown in the drawings are not to scale, emphasis instead being placed upon clearly illustrating the principles of exemplary embodiments of the present invention. Moreover, certain dimension may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention can support protecting an optical fiber from damage due to at least one of moisture incursion and mechanical stress. The optical fiber can be a component of a fiber optic cable that contains rounded bodies that provide water and/or moisture protection.

A first exemplary embodiment of the present invention supports protecting an optical fiber within a fiber optic cable. The protection can cushion the optical fiber from mechanical impact, shock, physical stress, jarring, unwanted motion, damaging acceleration or deceleration, force, or other harmful effect. Thus, cushioning the optical fiber can comprise stabilizing the optical fiber.

The fiber optic cable can comprise a jacket that extends along the fiber optic cable. The jacket can comprise a sheath, a sheathing, a casing, a shell, a skin, or a tube that spans the cable, typically comprising pliable or flexible material such as plastic or polymer. That is, the jacket can run lengthwise along the fiber optic cable. The jacket can form or define a core within the cable that can comprise a longitudinal cavity, a hollow space, or a cylindrical volume. In other words, the jacket can enclose a volume that contains various other elements, features, structures or components of the cable, with the jacket typically being open (prior to termination), and therefore exposing the core, at each end of the fiber optic cable.

One or more optical fibers can be situated in the core, running or extending lengthwise along the fiber optic cable. Various other linear cabling components, such as strength members, tapes, rip cords, and buffer tubes, may (or may not) also reside-in the core. The core can contain at least two porous bodies that help cushion the optical fibers. Typically, the core can contain many more than two such bodies, and may be essentially filled with these bodies. The porous bodies can have a generally rounded shape or a form that is spherical, ball-like, peanut-shaped, rounded, bulbous, or that is otherwise suited to absorbing shock or dissipating some physical stress or load.

A gas such as air can be disposed in the volume along with the porous bodies, with the gas contacting the porous bodies on at least some surface thereof. Accordingly, the porous bodies can be dry upon insertion into the volume (until perhaps absorbing any unwanted water that may enter the fiber optic cable). The porous bodies can comprise a foamed material, a closed cell structure, an open cell structure, a sponge or a spongy material, a synthetic polymer or plastic, an expanded material, a resilient or elastic substance, a soft nonporous material, or some other composition of materials that help to cushion or otherwise protect the optical fibers.

In connection with this first embodiment, a fiber optic cable can comprise small spheres or balls disposed in the cable's interstitial spaces, for example between the cable's optical fibers and a surrounding buffer tube. The spheres can comprise foam rubber, closed-cell or open-cell porous polymer, or some other soft material. Typical diameters for the spheres can be in a range of 1 to 2.5 millimeters. A soft composition of the spheres can cushion the optical fibers and physically impede water ingress into the cable. Additional fiber protection can arise from the ability or propensity of the loose spheres to rotate individually, in a ball-bearing effect. Thus, sphere-to-sphere motion can absorb physical stresses associated with bending, twisting, bumping, and stretching the cable during installation, thereby shielding the fibers from damage.

A second exemplary embodiment of the present invention supports protecting an optical fiber from attack by water, water vapor, liquid water, moisture, or humidity. A fiber optic cable can comprise a tube that extends along the fiber optic cable and that circumferentially surrounds an optical fiber or multiple optical fibers. The tube can comprise a sheath, sheathing material, a casing, a shell, a jacket that extends along the cable, a buffer tube, or a structure that is internal to the cable. The tube can comprise an-inner wall, such as a surface that faces the optical fiber. That is, the optical fiber can be disposed in the tube, with an inner surface of the tube facing towards the optical fiber and another, outer surface facing away from the optical fiber.

The fiber optic cable of this second exemplary embodiment can further comprise spheres or ball-shaped objects disposed between the optical fiber and the inner wall of the tube. That is, the tube can contain the optical fiber and two or more spheres or ball-shaped objects (and potentially other items too). Often, such spheres can fill a substantial portion of the tube. The spheres, can be ball-shaped, including forms that deviate from perfectly round, for example taking a shape somewhat like a football, a disk, a tablet, a pill, or an egg.

Each of the spheres can comprise a material, an agent, a chemical, or a substance that captures, takes up, collects, or absorbs water that may enter the tube. That is each sphere can interact with water (or some other foreign chemical or substance with a capability to harm the fiber) to inhibit the water from damaging the optical fiber. The interaction can comprise, without limitation, absorption, binding, one or more chemical reactions, adsorption, a material expansion of the material, soaking up (like an open cell sponge), etc.

The water absorbent material can be disposed at least partially within each sphere. Thus, each sphere can have a composition that includes the material and potentially other materials as well, such as binders, carrying agents, dry powders, cements, polymers, adhesives, foamed plastics, air, etc. Moreover, each sphere can be either homogenous or heterogeneous, for example.

In connection with this second embodiment, a fiber optic cable can comprise loose spheres or balls disposed in the cable's interstitial spaces, for example between the cable's optical fibers and a surrounding buffer tube. The spheres can have a diameter in a range of 20 microns to 2.5 millimeters. The composition of the spheres can include a material that absorbs water, such as a super absorbent polymer ("SAP"). The SAP material can be distributed uniformly within each sphere. The spheres not only can provide a carrier to facilitate inserting SAP material in the cable during manufacturing, but also can cushion the cable's fibers when the cable is placed in service. When the cable receives stress, motion among the spheres can absorb the stress to shield the fibers from damage.

A third exemplary embodiment of the present invention supports protecting an optical fiber from contact with water, moisture, or humidity that might otherwise damage the optical fiber. A system that is disposed in a fiber optic cable along with at least one optical fiber can afford the optical fiber at least some level of protection. The protection can comprise, cushioning, stabilization, or protection from water, moisture, humidity, or chemical attack, to name a few possibilities.

The system disposed in the cable can comprise an apparatus, a device, a composition, or a material. More specifically, the system can comprise two or more objects that are ball-shaped. That is, the objects can be egg-shaped, peanut-shaped, bulbous, ovaloid, ovoid, rotund, spherical, global, round, etc. The optical fiber and the ball-shaped objects can be in contact with one another, can be adjacent one another, or can be separated from one another by one or more elements, such as a buffer tube wall, a tape, or some other item.

Each of the ball-shaped objects can comprise an exterior surface that encloses or otherwise surrounds an interior region. Each object can further comprise a material, agent, chemical, or substance that absorbs water to help protect the optical fiber from water. The water can be water vapor, gaseous water, or liquid water, for example. The absorption of water can comprise physical absorption, chemical absorption, binding, one or more chemical reactions, adsorption, a material expansion of the material, or some other beneficial interaction, to list a few possibilities.

The water-absorbing material can adhere to the exterior surface, either directly or via some intermediary, such as glue, cement, or binding agent. The absorbing material can comprise a powder that is attached to the exterior surface, a film, a coating, or some other material configuration or form. Moreover, the absorbing material can fully cover the exterior surface, thus providing a skin or a shell with a second exterior surface. Further, the absorbing material can encapsulate the exterior surface.

In connection with this third embodiment, a fiber optic cable can comprise spheres or balls that are coated with a water absorbent material, such as SAP. The spheres can provide clean and efficient carriers for introducing SAP into the cable during manufacturing. The spheres can have a diameter in a range of 20 microns to 2.5 millimeters and can be disposed in the cable's interstitial spaces, for example between the cable's optical fibers and a surrounding buffer tube. The SAP material can adhere to the spheres as a cross-linked coating or via electrostatic charge, for example. Beyond absorbing any water that may enter the cable, the spheres can provide cushioning or mechanical protection for the optical fibers. When the cable receives stress, motion among the spheres can absorb the stress to shield the fibers from damage.

Figure 1:
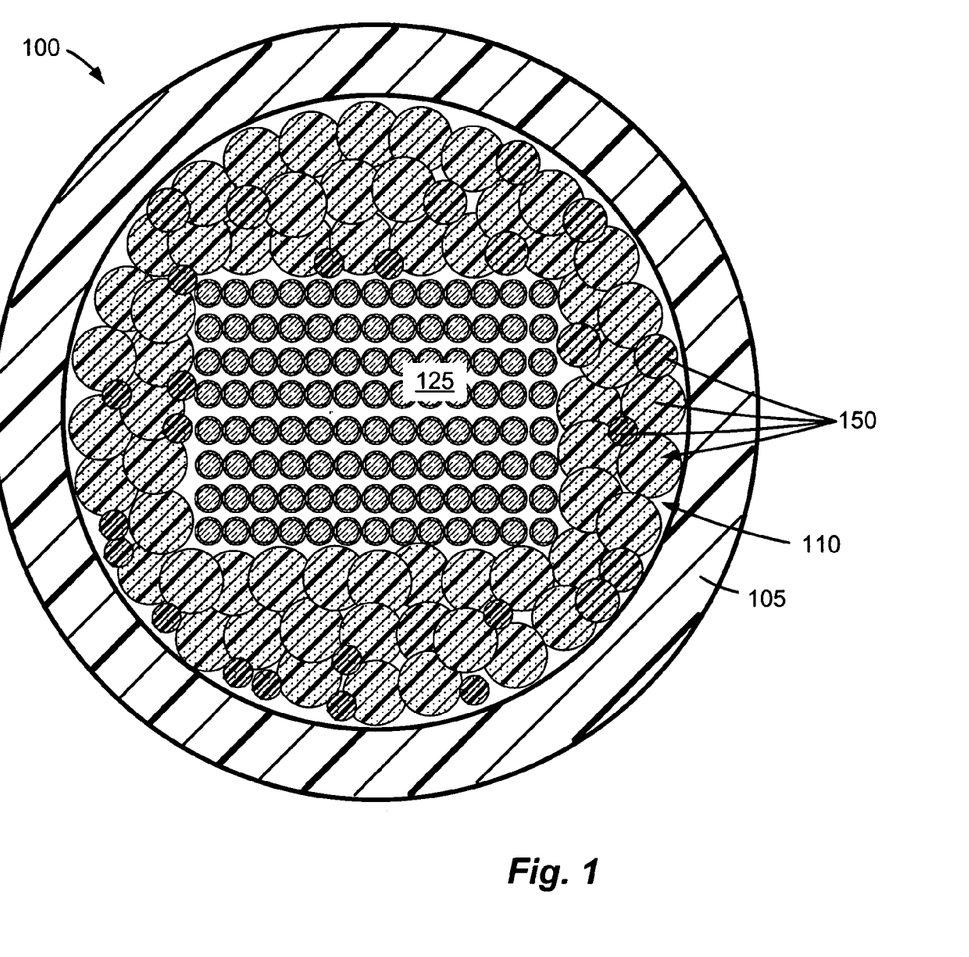
FIG. 1 is a cross sectional view of an exemplary fiber optic cable comprising a plurality of spherical shaped bodies that cushion the cable's optical fibers in accordance with an embodiment of the present invention.
Figure 2A:
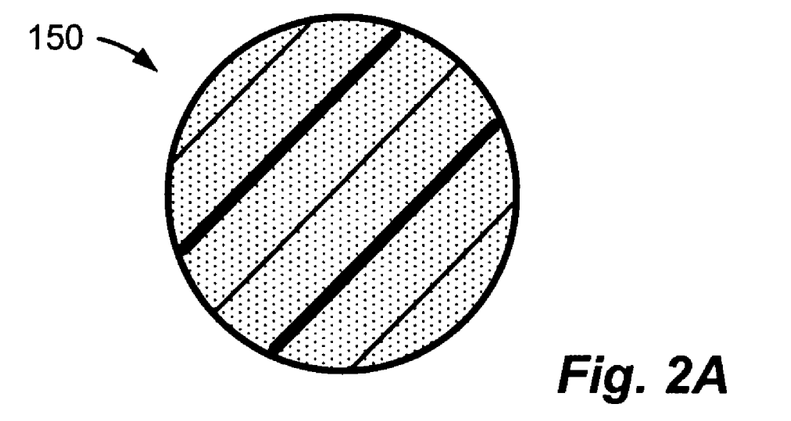
FIGS. 2A and 2B are cross sectional views of exemplary spherical shaped bodies that provide cushioning protection for optical fibers in accordance with embodiments of the present invention.
Figure 2B:
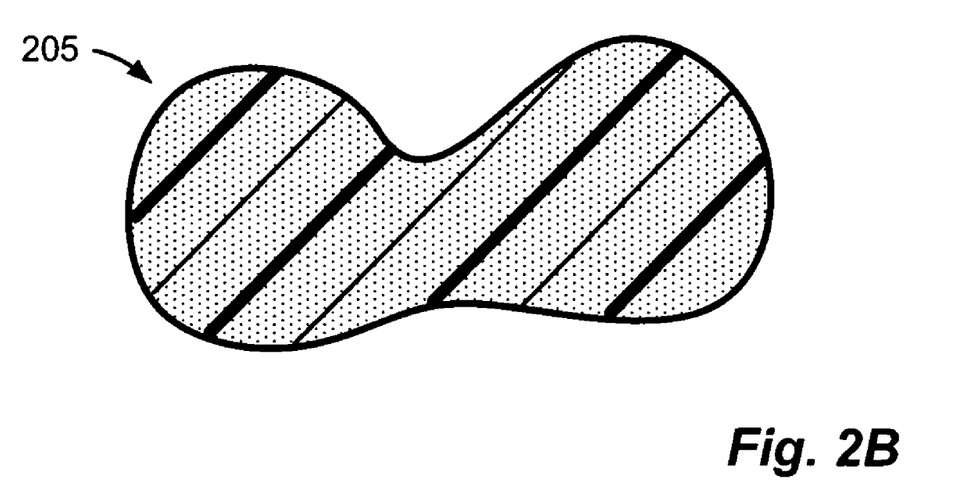
Figure 2C:
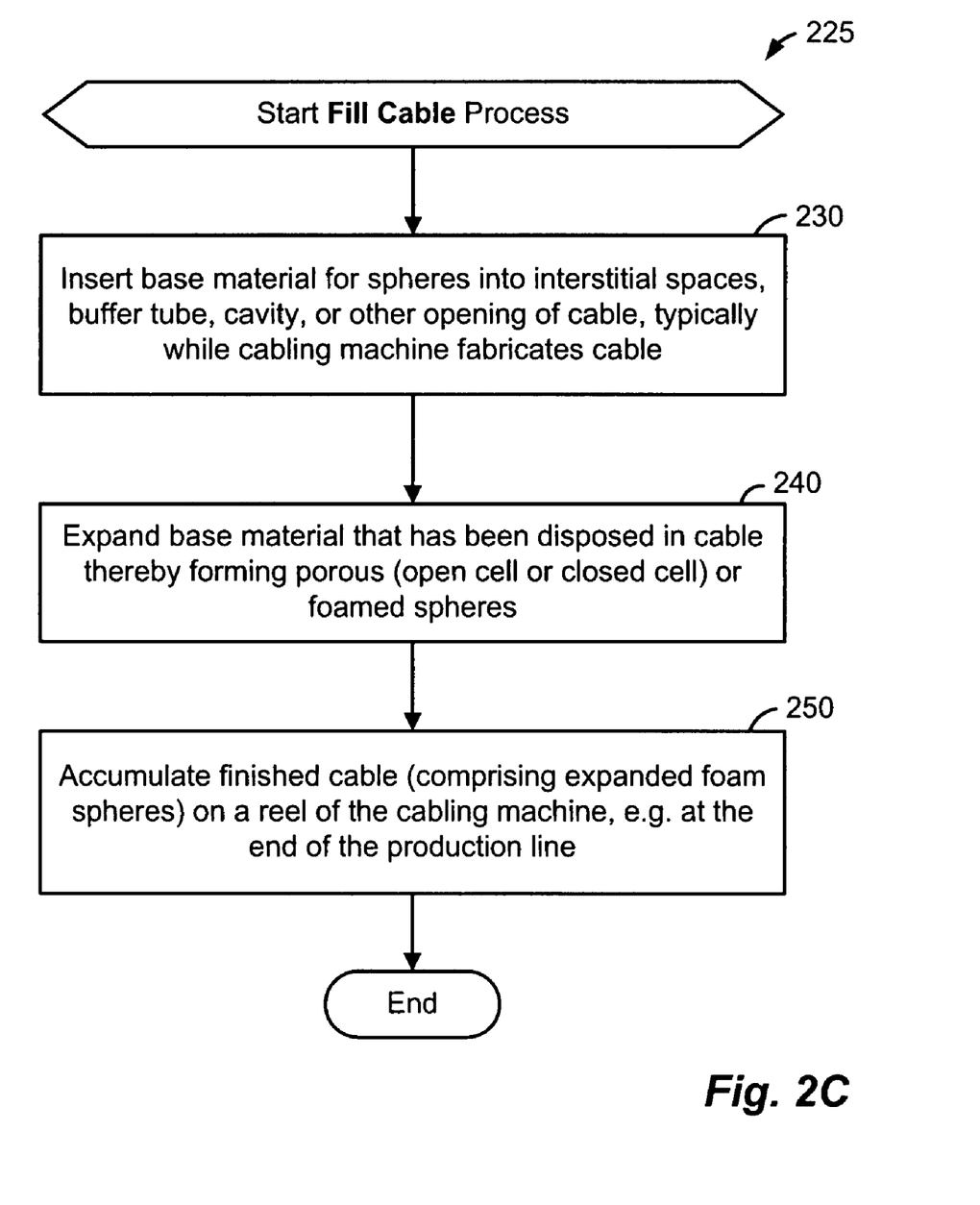
FIG. 2C is a flowchart of an exemplary process for disposing spherical shaped bodies in a fiber optic cable to provide fiber protection in accordance with an embodiment of the present invention.
Figure 3A:
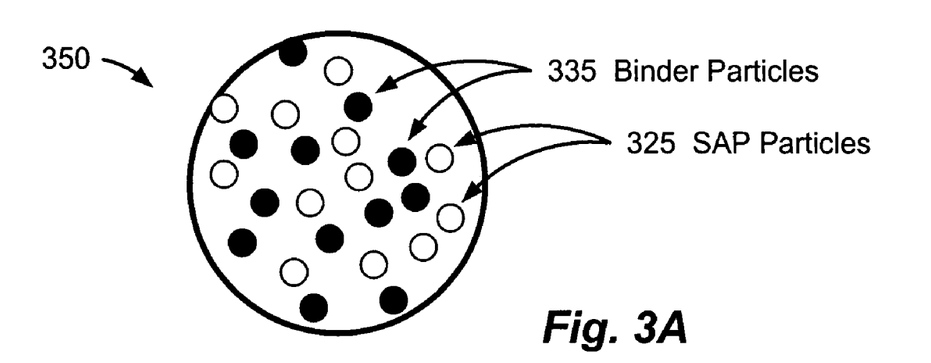
FIG. 3A is a cross sectional view of an exemplary spherical shaped body that has water absorbent material disposed therein in accordance with an embodiment of the present invention.
Figure 3B:
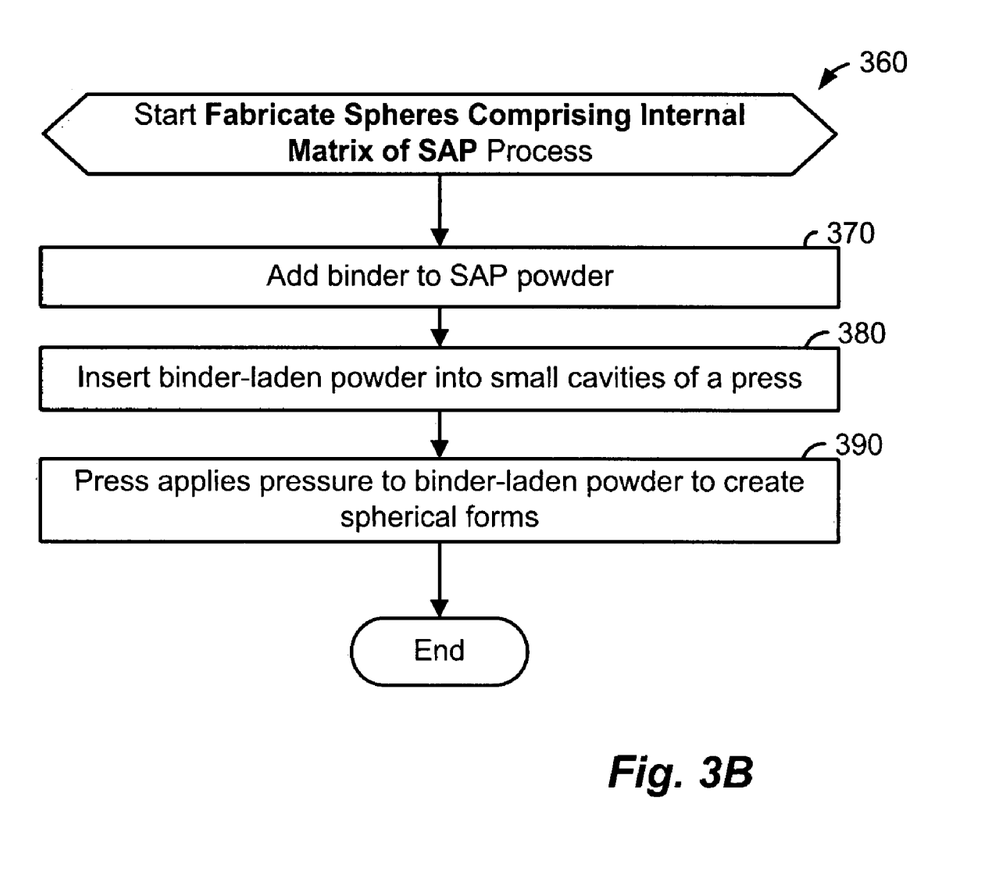
FIG. 3B is a flowchart of an exemplary process for fabricating spherical shaped bodies that comprise water absorbent material in accordance with an embodiment of the present invention.
Figure 6:
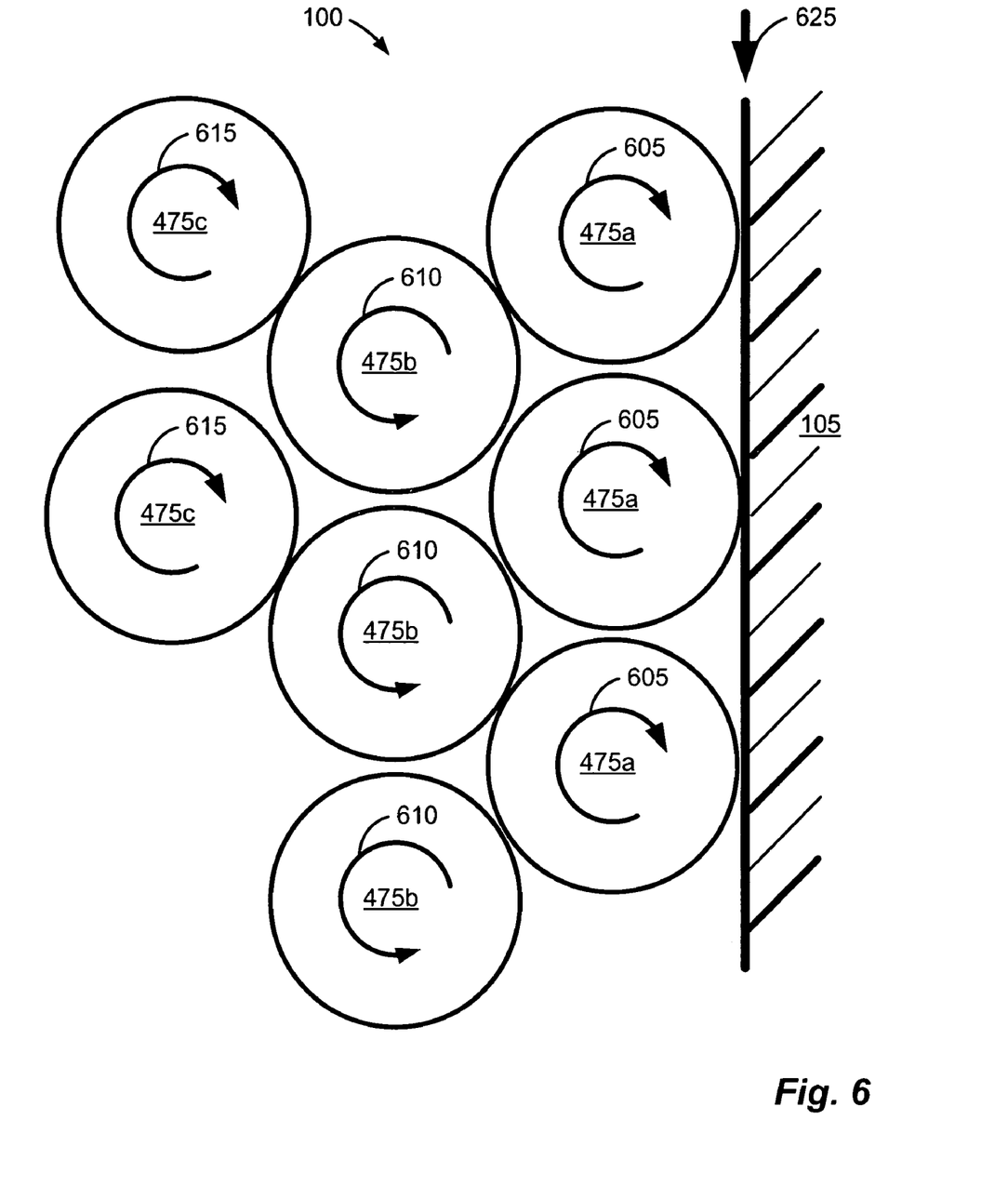
FIG. 6 is an illustration of an exemplary distribution of force and/or motion in a fiber optic cable that comprises a plurality of spherical bodies in accordance with an embodiment of the present invention.
Figure 7:
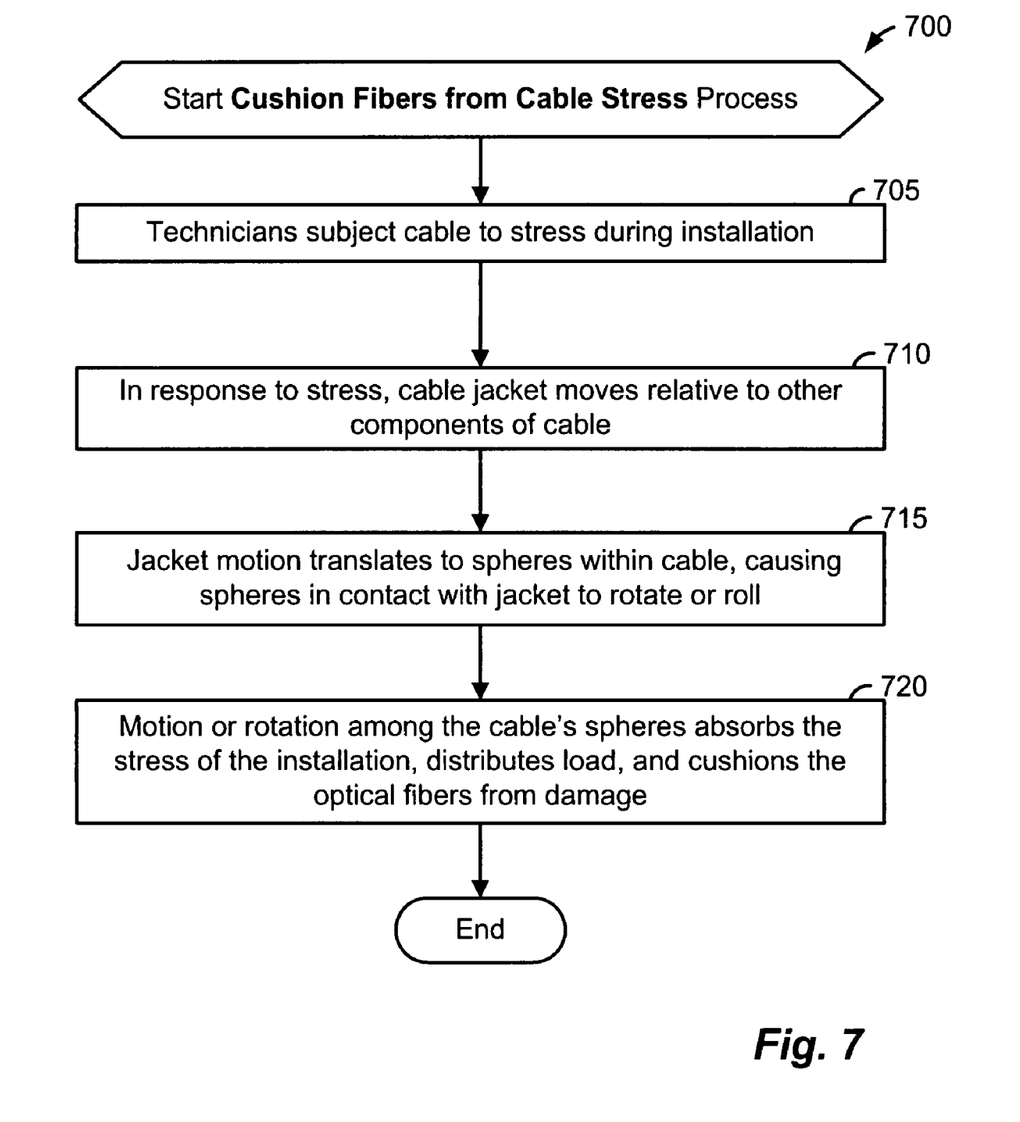
FIG. 7 is a flowchart of an exemplary process for cushioning an optical fiber of a cable via distributing force or motion among a plurality of spherical bodies disposed in the cable in accordance with an embodiment of the present invention.

A method and apparatus for protecting an optical fiber will now be described more fully hereinafter with reference to FIGS. 1-7, which describe representative embodiments of the present invention. FIG. 1 provides an end-on view of a fiber optic cable that contains protective material. FIGS. 2A and 2B show representative geometrical forms of the protective material, while FIG. 2C shows a method for inserting the material into a fiber optic cable. FIGS. 3A and 3B describe an embodiment of the protective material wherein moisture absorbent material is dispersed within a rounded body. FIGS. 4A, 4B, 4C, 5A, and 5B describe embodiments of the protective material in which moisture absorbent material is attached to an outer surface of a rounded body. FIGS. 6 and 7 present the protective material absorbing force within a fiber optic cable.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates a cross sectional view of a fiber optic cable 100 that comprises a plurality of spherical shaped bodies 150 that cushion the cable's optical fibers 125 according to an exemplary embodiment of the present invention.

The fiber optic cable 100 comprises a jacket 105 that provides an outer, cylindrical surface of the cable 100. The jacket 100 can have a polymer composition, for example a fluoropolymer such as FEP, TFE, PTFE, PFA, etc, Alternatively, the jacket 105 can comprise olefin, polyester, silicone, polypropylene, polyethylene, polyimide, or some other polymer or other material that provides acceptable strength, fire resistance, or abrasion and chemical properties as may be useful for various applications. Generally, the jacket 105 provides environmental protection as well as strength.

In some embodiments, the jacket 105 can be internal to the fiber optic cable 100, for example encased in another jacket or sheath that FIG. 1 does not explicitly illustrate. Thus, as an alternative to providing an external covering, the illustrated jacket 105 can represent a buffer tube or some other tube internal to a cable.

The jacket 105 defines a core 110 of the fiber optic cable 100 that may contain one or more buffer tubes, tapes, and ripcords (not illustrated) as well as the illustrated elements. Disposed within the fiber optic cable 100 are ribbons of optical fibers 125 that extend lengthwise along the cable 100. The optical fibers 125 can be single mode, or multimode, plastic, glass, silica, etc. The illustrated number of optical fibers 125 and the illustrated ribbon configuration are intended to be exemplary rather than limiting. Each optical fiber 125 could be a single mode fiber or some other optical waveguide that carries data optically at 10 Giga bits per second ("Gbps"), for example.

In addition to the optical fibers 125, the core 110 contains loose spherical bodies 150 that protect the optical fibers 125, as discussed in further detail herein. The spherical shaped bodies 150 will be often referred to herein as "spheres" however, those elements can have a variety of shapes that may deviate from a perfectly symmetrical sphere. In various embodiments, the bodies 150 can comprise pellets, balls, ball-shaped objects, ball-shaped bodies, rounded bodies, globes, globular elements, beads, spherical particles, peanut-shaped objects, bulbous objects, dumbbell-shaped elements, eggs, disks, oval-shaped members, football-shaped objects, etc. Thus, the aforementioned shapes can be exemplary embodiments of spheres in accordance with the general use of the terms "sphere" or "spheres" as provided herein.

The spheres 150 disposed within the fiber optic cable 100 can all be within a predefined range of dimensions or diameters. Alternatively, the cable's spheres 150 can have varied or even random diameters. The spheres 150 in one specific fiber optic cable 100 can be all of essentially the same shape. Or, a single fiber optic cable 100 can contain spheres of various shapes and sizes.

In an exemplary embodiment, the fiber optic cable 100 comprises a gas such as air or nitrogen in the interstitial spaces between each of the spheres 150. That is, the core 110 can comprise air. Thus, the spheres 150 can be in contact with air or gas when disposed in the cable 100. In one exemplary embodiment, at least some area of the core 110 exclusively contains spheres 150 and a gas. For example, some portion of the annular space within the fiber optic cable 100 may essentially consist of the spheres 150 and air. In one exemplary embodiment, the core 110 consists (or essentially consists) of spheres 150, air, and optical fibers 125.

Turning now to FIGS. 2A and 2B, these figures illustrate cross sectional views of spherical shaped bodies 150, 205 that provide cushioning protection for optical fibers 125 according to exemplary embodiments of the present invention.

As discussed above with reference to FIG. 1, the spheres 150 provide physical or mechanical protection for the optical fibers 125 of the fiber optic cable 100, akin to a pillow or a cushion effect. When the fiber optic cable 100 receives a blow, the spheres 150 absorb the shock of the blow, thereby dampening the impact that the optical fibers 125 experience.

In one exemplary embodiment, the spheres 150 have a composition of porous polymeric material, either closed cell or open cell. In an open cell embodiment, various ones of the pore can communicate with one another, thus pore-to-pore channels can transmit air from pore to pore. An ordinary kitchen sponge is an example of an open cell synthetic polymer. In a closed cell embodiment, various pores are independent of one another. Thus, the cell walls impede air from moving from pore to pore. Whether open or closed cell, the spheres 150 can comprise a gas such as nitrogen or air in the pores. Accordingly, each sphere 150 can comprise bubbles, for example filled with gas.

The spheres 150 can be resilient and/or comprised of an elastic or elastomeric material. In one exemplary embodiment, the spheres are comprised of polyurethane foam or alternatively of a biodegradable starch. An exemplary size range for a porous embodiment of the spheres 150 is 1 millimeter to 2.5 millimeters. The spheres 150 can also be sized according to the diameter of the optical fibers 125. For example, the spheres 150 can have a diameter that is at least 10, 50, or 100 times larger than the diameter of the optical fibers, or in some range thereof.

Alternatively, the spheres 150 can have a diameter that is related to the diameter of the fiber optic cable 100. For example, the spheres 150 can have a diameter that is less than ⅕ or ⅒ the diameter of the fiber optic cable 100, or in some range thereof.

The sphere 205 of FIG. 2B illustrates an exemplary shape that deviates from perfectly round. More specifically, the sphere 205 is shaped like a peanut, which is one of many possible shapes.

Turning now to FIG. 2C, this figure illustrates a flowchart of a process 225 for disposing spherical shaped bodies 150 in a fiber optic cable 100 to provide fiber protection according to an exemplary embodiment of the present invention. Process 225, which is entitled "Fill Cable" will be described with exemplary reference to FIGS. 1 and 2A.

At Step 230 of Process 225, a base material for the spheres 150 is inserted into the fiber optic cable 100, specifically the core region 110. Typically, this insertion is conducted in a production line, for example at a station or a zone within a cabling machine.

In an exemplary cabling machine, the optical fibers 125 feed continuously from reels, bins, containers, or other bulk storage facilities at the head end (upstream side) of the machine. Downstream, a nozzle or outlet port extrudes a polymeric jacket, skin, casing, or sheath 105 over the optical fibers 125, thus providing a basic cabling configuration similar to the one that FIG. 1 illustrates as discussed above.

The spheres 150 are inserted in core 110, specifically in the space between the fibers 125 and the interior face of the jacket 105. A gravity feed, a float feed, and/or an air/gas feed can carry the spheres 150, or a base material thereof into the core 110. Thus, air can be the carrier for placing the spheres 150 into the core 110.

The spheres 150 are typically fed into the core 110 as the cabling machine forms the fiber optic cable 100. For example, the insertion point can be adjacent, at, or immediately downstream of the zone at which the jacket 105 is formed over the optical fibers 125. As a base material, the spheres 150 can be inserted in a compressed or unexpanded state.

At Step 240, once the compressed spheres are inserted into the core 110, the cabling machine can apply thermal regulation to control sphere expansion, for example according to the pore size. In one exemplary embodiment, contact with the heated environment of the forming cable core 110 can trigger the compressed spheres 150 to expand. In one exemplary embodiment, a chemical reaction liberates nitrogen or some other gas from the chemical structure of the compressed spheres, causing an expansion that essentially fills the core 110 with expanded spheres 150. That is, expanding bubbles or pores can form in the spheres 150 in response to the insertion of the spheres 150 into the core 110.

In one exemplary embodiment, the cabling machine inserts into the core 110 the microspheres that Akzo Nobel (having a location in Duluth, Ga.) sells under the trade name "EXPANCEL." Those microspheres have a polymer shell encapsulating a gas. Upon application of heat, the gas inside the shell increases pressure, and the shell softens. A dramatic increase in volume of the microspheres follows. The volume of each microsphere typically increases more than 40 fold, thereby providing the spheres 150 in accordance with the illustration of FIG. 1. Thus, the microspheres expand to stabilize the optical fiber 125 and to provide protection when the fiber optic cable 100 is handled in the field.

In one exemplary embodiment, the core 110 is slightly under filled with the expanded spheres 150. In one exemplary embodiment, the core 110 is overfilled so that the expanded spheres 150 exert at least some pressure on the walls of the jacket 105. Thus, the spheres 150 can be either compressed within core 110 or loose, with some excess space available for the spheres 150 to rearrange in response to cable stress.

At Step 250, a take-up reel at the downstream side of the cabling system winds up the finished fiber optic cable 100 in preparation for field deployment. Following Step 250, Process 225 ends and the fiber optic cable 100 is fabricated. Accordingly, Process 225 provides an exemplary method for fabricating a fiber optic cable 100 comprising a system of discrete bodies 150 that fill the cable's core 110 to protect the cable's delicate optical fibers 100.

Turning now to FIG. 3A, this figure illustrates a cross sectional view of a spherical shaped body 350 that has water absorbent material 325 disposed therein according to an exemplary embodiment of the present invention. More specifically, FIG. 3A illustrates an embodiment of the spheres 150 depicted in FIG. 1, wherein the sphere 350 of FIG. 3A comprises a material 325 that absorbs water or otherwise blocks water molecules from attacking the optical fiber 125.

In addition to a water absorber 325, the sphere 350 may comprise any of the materials discussed above, including those features discussed with reference to the sphere 150 of FIG. 1. In one exemplary embodiment, the sphere 150 of FIG. 1 has been laden with an agent that absorbs water, thereby creating the sphere 350 of FIG. 3A. Alternatively, the sphere 350 can have other distinct properties or features. The sphere 350 can be essentially free from pores, bubbles, or similar structures in one exemplary embodiment.

In one exemplary embodiment, the sphere 350 can have a diameter in a range of 20 microns to 2.5 millimeters. In one exemplary embodiment, the sphere 350 has a diameter that is larger than the core diameter of the optical fiber 125. That core diameter might be about 10 microns for a single mode communications optical fiber, for example. In one exemplary embodiment, the sphere 350 has a diameter that is larger than the cladding diameter or the outer diameter of one or all of the optical fibers 125.

As illustrated, the sphere 350 comprises SAP 325 that captures moisture that may enter the fiber optic cable 100. The SAP 325 is essentially distributed uniformly throughout the sphere 350. In an exemplary embodiment, the sphere 350 can comprise 5% to 50% SAP 325 on a weight or molar basis. In one exemplary embodiment, the cable 100 contains a mix of spheres 150 that have little or no SAP 325 and other spheres 350 that comprise a substantive amount of SAP 325. Certain spheres 350 can even have a composition of essentially pure SAP, that is about 100% SAP. The composition may further include stabilization material, fillers, or inert or active chemicals.

The term "super absorbent polymer" or "SAP," as used herein, generally refers to a material that can absorb or otherwise capture at least 50 times its weight in water (including without limitation liquid and vapor forms of water) or a liquid. Polyacrylonitrile starch graft polymer, saponified polyacrylonitrile starch graft polymer, polyacrylamide, and polyacrylate superabsorbent are examples of SAP. Typically, SAP swells or may assume a gelatinous state in the presence of water, thereby absorbing the water. SAP materials may have a granular or powder form, may be beads, and may come in a variety of shapes. Some SAP materials can be liquid at room or operational temperature. Many SAP materials can absorb 100 times their weight in water.

Turning now to FIG. 3B, this figure illustrates a flowchart of a process 360 for fabricating spherical shaped bodies 350 that comprise water absorbent material 325 according to an exemplary embodiment of the present invention. Accordingly, Process 360, which is entitled "Fabricate Spheres Comprising Internal Matrix of SAP," provides an exemplary method for producing the spheres 350.

At Step 370, SAP material 325 is provided in a powder form, for example from a commercial source. The particle size of the powder can be less than 100 or 1000 times the size of the finished spheres 350, for example. Particles 335 of binding agent are mixed with the powder of SAP particles 325. The binder 335 can comprise an epoxy, a cement, a starch, an adhesive, a glue, or a crosslinking agent, for example. As an alternative to having a dry, particulate form, the binder can have a liquid form that eventually dries.

At Step 380, the powder of SAP particles 325 and binder particles 335 are placed in cavities of a mold or a press. The cavities can have the desired shape of the finished sphere 350. For example, the cavities can be egg-shaped, spherical, cylindrical, tablet-shaped, oblong, etc.

At Step 390, the press exerts pressure on the mixture of SAP and binder particles 235, 335, resulting in the desired form of the sphere 350. That is, the mold compression causes the powder to hold the desired shape. In one exemplary embodiment, the compression produces heat that induces at least some crosslinking bonds within the sphere 350. Such bonds can be between binder particles 335, between SAP particles 325, or from binder particles 335 to SAP particles 325.

Steps 380 and 390 can be analogous to forming a drug tablet, such as an aspirin, by compressing powdered forms of a pharmaceutical agent with fillers, binders, and other materials. Moreover, Steps 380 and 390 can involve processing SAP particles 325 and other particles 335 with equipment that is commonly used in the pharmaceutical industry to manufacture drug tablets.

Process 360 ends following Step 390. The resulting spheres 350 can be characterized as pellets. The term "pellet" or "pellets," as used herein, generally refers to a three-dimensional body that comprises particles that are bound together or that are otherwise attached to one another. The three-dimensional body may have a generally arbitrary size and shape. Respective ones of the particles may have at least two different compositions. Alternatively, each of the particles can have an essentially common composition.

As an alternative to using a press to manufacture the spheres 350, they can be formed in a tumbling machine. The spheres 350 can be fabricated in a slurry form, for example using a non-active liquid (other than water) that the SAP 325 does not absorb.

Figure 4A:
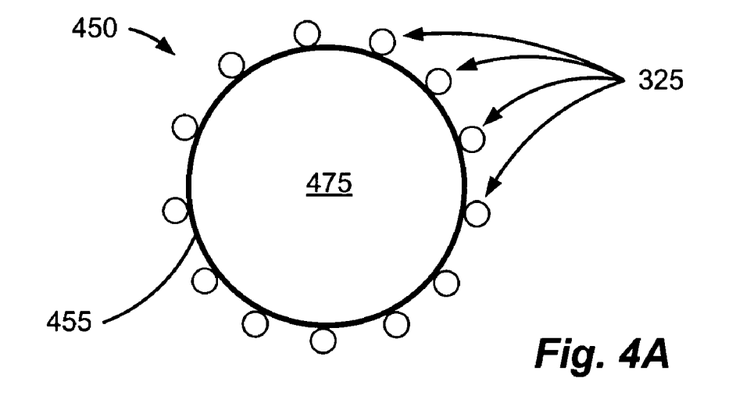
FIG. 4A is a cross sectional view of an exemplary spherical shaped body that has water absorbent material attached to a surface thereof in accordance with an embodiment of the present invention.
Figure 4B:
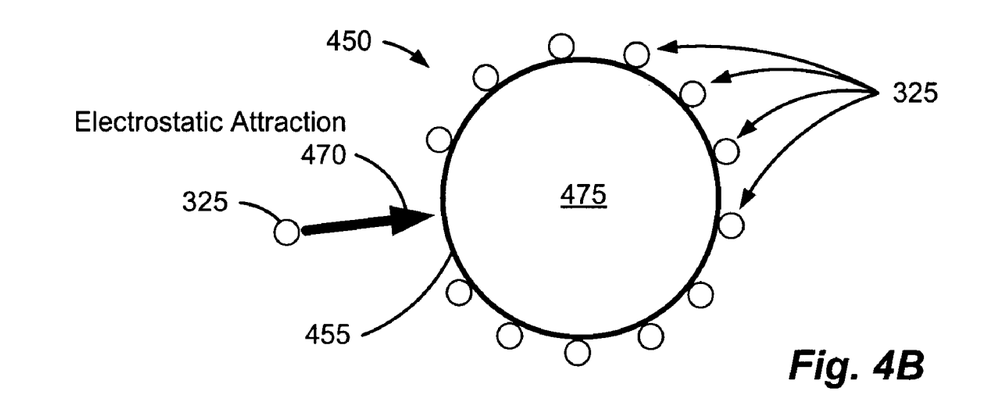
FIG. 4B is an illustration of an exemplary force that adheres a water absorbent material to a surface of a spherical shaped body in accordance with an embodiment of the present invention.

Turning now to FIG. 4A and FIG. 4B, FIG. 4A illustrates a cross sectional view of a spherical shaped body 450 that has water absorbent material 325 attached to a surface 455 thereof according to an exemplary embodiment of the present invention. FIG. 4B illustrates a force 470 that adheres a water absorbent material 325 to a surface 455 of a spherical shaped body 475 according to an exemplary embodiment of the present invention. Accordingly, FIGS. 4A and 4B describe another exemplary embodiment of a sphere 150, 450 that can be disposed in a fiber optic cable 100 to help protect the cable's optical fibers 125 from physical damage and moisture degradation.

The sphere 450 of FIGS. 4A and 4B comprises a central or interior portion 475, including the surface 455. In one exemplary embodiment, the sphere 475 is the sphere 150 of FIG. 2A, discussed above. However, the interior portion 475 can be porous or nonporous and may be soft, pliable, elastic, or essentially rigid or firm. The surface 455 can be smooth, or alternatively rough, on a microscopic level.

Adhering to the outer surface 455 are particles 325 of SAP. Although the SAP particles 325 can completely cover the inner sphere 475, the surface 455 can still be considered an "outer surface," an "outer region," or an "outer area."

As discussed below, the SAP particles 325 may adhere to the surface 455 temporarily, to facilitate insertion in the core 110 of the fiber optic cable 100. Alternatively, the SAP particles 325 can be permanently attached to the surface 455. As shown in FIG. 4B, an electrostatic force 470 can attract the particles to the sphere 475, thereby creating the sphere 450. Alternatively, epoxy, adhesive, bonding agent, or crosslink bonds can hold the SAP particles 325 in place on the surface of the sphere 475.

Figure 4C:
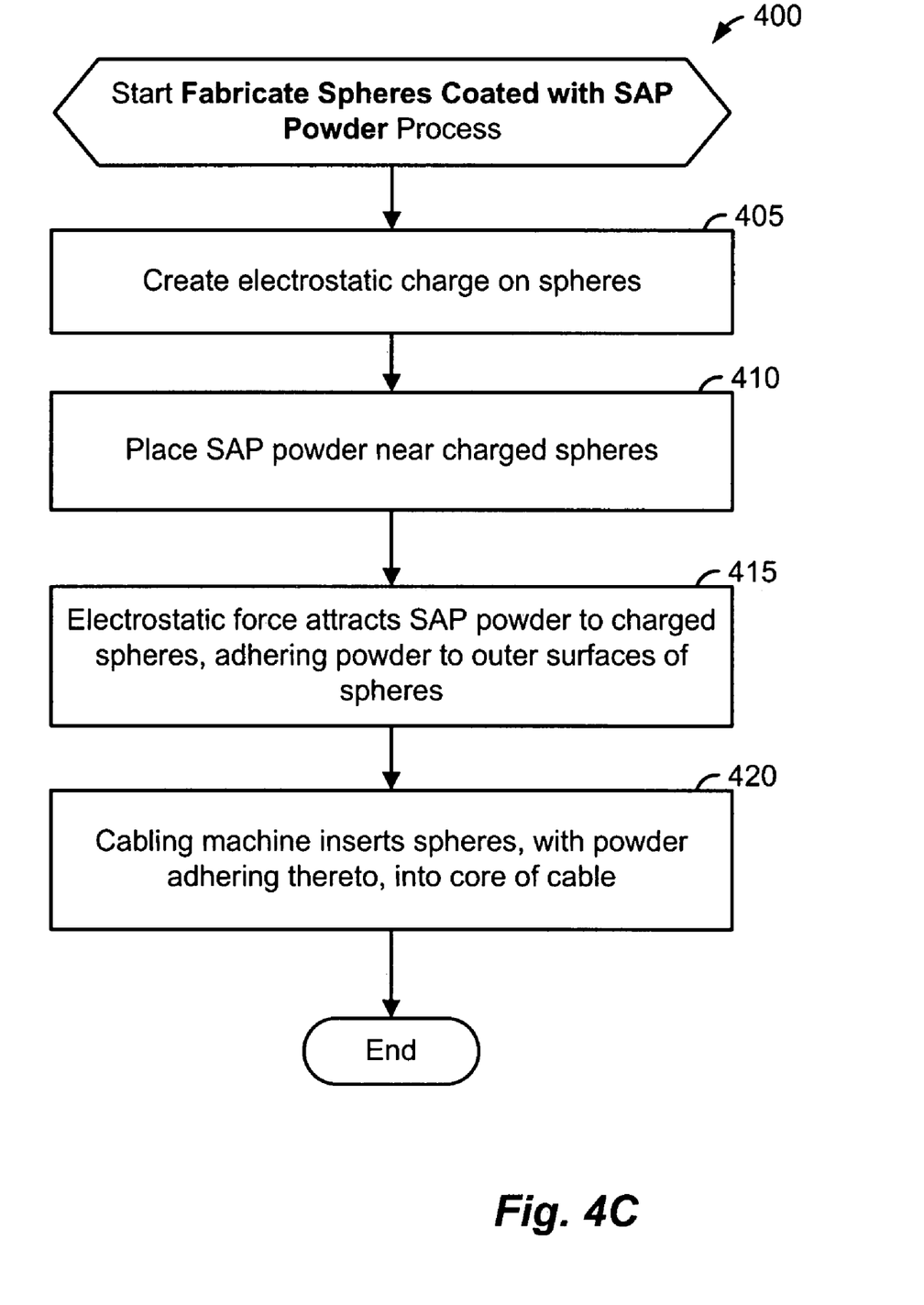
FIG. 4C is a flowchart of an exemplary process for applying water absorbent material to a surface of a spherical shaped body in accordance with an embodiment of the present invention.

Turning now to FIG. 4C, this figure illustrates a flowchart of a process 400 for applying water absorbent material 325 to a surface 455 of a spherical shaped body 475 according to an exemplary embodiment of the present invention. Process 400, which is entitled "Fabricate Spheres Coated with SAP Powder," provides an exemplary method for fabricating the spheres 450 of FIGS. 4A and 4B, as discussed above.

At Step 405, a static charge is created on the spheres 475, typically in a bulk or powder form. For example, a Meech static generator, a Van de Graaff generator, or a Wimshurst machine may create and transfer electrical charge to the spheres 475.

At Step 410, the SAP particles 325 are placed near the charged spheres 475. In this operation, the SAP particles 325 typically remain in a powder form. A plastic material handling arm, screw, or similar apparatus can bring these materials together, for example. The material handling equipment is typically designed to avoid prematurely depleting the electrical charge.

At Step 415, the electrostatic force 470, resulting from a positive and/or a negative electrical charge, draws the SAP particles 325 to the surface 455 of the spheres 475. That is, a voltage or a potential difference creates the force 470. The SAP particles 325 may partially or entirely cover the surface 455, and the particles 325 can be uniformly distributed thereon or concentrated in one or more regions thereof.

At Step 420, the cabling machine introduces the spheres 450, including the adhering particles 325, into the cable core 110. As discussed above with reference to Process 225 and FIG. 2C, the feed mechanism can be based on gravity or air and can operate in tandem with a jacket extrusion zone of the cabling machine. In one exemplary embodiment, a screw feed or a screw conveyor feeds the spheres 450, including the SAP particles 325 attached thereto via static electricity, into the cable core 110.

Process 400 ends following Step 420. After the spheres 450 are inserted in the fiber optic cable 100, the static charge (and accompanying force 470) may gradually dissipate. Thus, in an exemplary embodiment, the SAP particles 325 may separate from the core sphere 475 after the fiber optic cable 100 is fabricated and prior to deploying the finished cable 100 in the field.

Figure 5A:
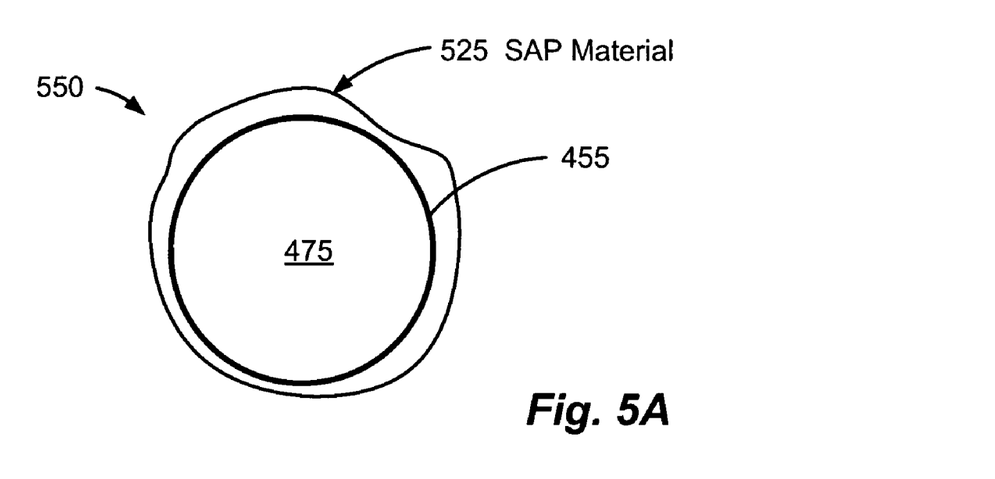
FIG. 5A is a cross sectional view of an exemplary spherical shaped body that comprises a film or a coating of water absorbent material attached to a surface thereof in accordance with an embodiment of the present invention.

Turning now to FIG. 5A this figure illustrates a cross sectional view of a spherical shaped body 550 that comprises a film or a coating of water absorbent material 525 attached to a surface 455 thereof according to an exemplary embodiment of the present invention. More specifically, FIG. 5A describes another exemplary embodiment of a sphere 150, 450, 550 that can be disposed in a fiber optic cable 100 to help shield the cable's optical fibers 125 from stress and moisture.

In an exemplary embodiment, the center portion 475 of the sphere 550 can have one or more of the features of the corresponding area 475 of the sphere 450 shown in FIGS. 4A and 4B and discussed above. However, as illustrated in FIG. 5A, the exemplary sphere 550 comprises an essentially solid or contiguous coating 525 of SAP material over the surface 455. That is, the coating 525 comprises a film or a shell. The coating 525 can resemble a painted covering, for example. Although the SAP film 525 can completely cover the inner sphere 475, the surface 455 can still be considered the "outer surface," the "outer region," or the "outer area."

In one exemplary embodiment, the sphere 475 provides a substrate to which the film coating 525 adheres. In one exemplary embodiment, the SAP coating 525 is cross linked to itself, forming a pliable or a rigid skin. Rather than having direct adhesion to the surface 455, the adhesion can be indirect, resulting from the film coating 525 fully encapsulating the sphere 475 and adhering to itself. That is, a coating 525 that closes on itself can remain in place on the inner sphere 475 without necessarily requiring chemical or other bonding between the coating 525 and the sphere 475.

In one exemplary embodiment, the SAP coating 525 has a thickness in a range of about 1-5 mils (thousandths of an inch) or about 25-125 microns. In one exemplary embodiment, the coating 525 has a thickness of about 0.5 mils or about 13 microns, or less. The SAP coating 525 can be of uniform thickness or alternatively can comprise thickness variations, as illustrated. The SAP coating 525 can be viewed as a three dimensional annulus that surrounds the inner sphere 475.

Figure 5B:
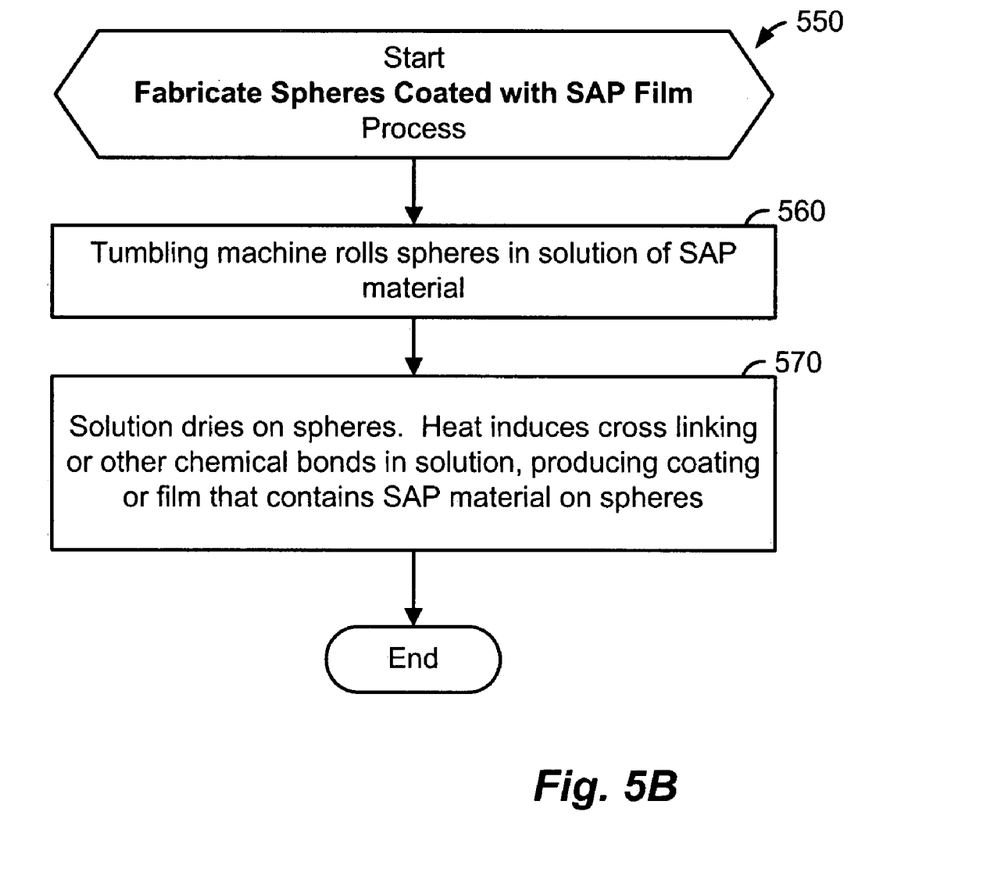
FIG. 5B is a flowchart of an exemplary process for applying a coating or a film of water absorbent material to a surface of a spherical shaped body in accordance with an embodiment of the present invention.

Turning now to FIG. 5B, this figure illustrates a flowchart of a process 550 for applying a coating or a film 535 of water absorbent material 525 to a surface 455 of a spherical shaped body 475 according to an exemplary embodiment of the present invention. Process 550, which is entitled "Fabricate Spheres Coated with SAP Film," provides an exemplary method for producing the sphere 550 of FIG. 5A, discussed above.

At Step 560, a tumbling machine rolls the inner sphere 475 in a solution of SAP material. Alternatively, some other mixing apparatus can stir or coat the spheres 475 in an SAP solution or mixture. The solution can comprise a slurry of SAP particles 325 suspended or otherwise mixed in a liquid or a solvent that the SAP material avoids absorbing. Alternatively, the coating solution can comprise a liquid form of SAP, for example. That is, the SAP stock can have a liquid phase an alternative to being a mixture of solid and liquid materials.

At Step 570, the spheres 475, each having some SAP material 525 thereon, are removed from the tumbling or mixing machine. A material handling system may place the wetted spheres 475 on a conveyor, for example. In one exemplary embodiment, the conveyor transports the wetted spheres 475 through an oven or under a heat lamp. The SAP solution dries, typically inducing at least some crosslinks or other chemical reaction to create the SAP coating 525.

Following Step 570, the spheres 550 are formed and Process 550 ends. A cable manufacturing line can insert the finished spheres 550 into a fiber optic cable 100 as discussed above. In addition to (or in connection with) providing a pillowing or cushioning protection, protection can come from the spheres 550 interacting mechanically with one another and with other components of the fiber optic cable 100. Such protection will now be discussed with reference to FIGS. 6 and 7.

FIG. 6 illustrates distribution of force and/or motion 625 in a fiber optic cable 100 that comprises a plurality of spherical bodies 475a, 475b, 475c according to an exemplary embodiment of the present invention. In an exemplary embodiment, the illustrated spherical bodies 475a, 475b, 475c can comprise the spheres 475 or essentially any of the bodies discussed above with reference to various figures.

Meanwhile, FIG. 7 illustrates a flowchart of a process 700 for cushioning an optical fiber 125 of a cable 100 via distributing force or motion 625 among a plurality of spherical bodies 475a, 475b, 475c disposed in the cable 100 according to an exemplary embodiment of the present invention. Process 700, which is entitled "Cushion Fibers from Cable Stress," will be discussed along with and with exemplary reference to FIG. 6.

At Step 705 of Process 700, technicians, or other personnel handle the fiber optic cable 100, for example in connection with installing or servicing the cable 100. The handling can involve machinery, automated equipment, manual manipulation, or personal contact. The technicians, or some machine, subject the fiber optic cable 100 to stress. The stress can occur, for example, from dropping the cable 100, stretching, unrolling, twisting, a crushing event, an impact, inadvertently bumping an object into the cable 100, bending the cable 100, etc.

At Step 710 and as shown in FIG. 6, the fiber optic cable 100 responds to the applied stress, with the cable jacket 105 undergoing a movement or a force 625. That is, relative to the fiber optic cable 100 as a whole or to some other component of the cable 100, at least some region of the jacket 105 moves 625 or is subjected to a force 625.

At Step 715, the jacket motion or force 625 transfers or translates to the spheres 475a, 475b, 475c. The spheres 475a that are in contact with the jacket 105 roll in response to the motion 625. As illustrated, these spheres 475a rotate clockwise 605 as driven by the downward force 625 of the jacket 105. The spheres 475b that contact the spheres 475a as illustrated (without contacting the jacket 105) rotate in the opposite, counterclockwise direction 610. Thus, rotation 605 of the first row of spheres 475a drives rotation 610 of the second row of spheres 475b. Likewise, the second row of spheres 475b induces rotation 615 in the third row of spheres 475c.

Although FIG. 6 illustrates three rows of spheres 475a, 475b, 475c, the fiber optic cable 100 may have many more spheres 475 that may be disposed in somewhat random orientations, rather than neat rows. Those skilled in the art having benefit of this disclosure will appreciate that the illustration of FIG. 6 has been simplified somewhat for explanatory purposes and to convey certain exemplary principles of operation.

Accordingly, at Step 720 the stress of the jacket movement 625 is distributed among many spheres 475a, 475b, 475c. This distribution of movement, load, or force 625 among the spheres 475a, 475b, 475c avoids concentrating impact or stress on a particular location of the optical fiber 125. Moreover, energy of the motion 625 can be converted into friction or heat that is dispersed among the spheres 475a, 475b, 475c. Thus, the system of spheres 475a, 475b, 475c respond in a coordinated fashion to help protect the optical fiber 125. Process 700 ends following Step 720.

Process 700 can be viewed as the spheres 475a, 475b, 475c functioning analogously to a set of ball bearings that smoothly distribute a motion, a force, or a load. That is, the spheres 475a, 475b, 475c can stabilize and protect the optical fibers 125 via what can be described as a "ball bearing effect."

While FIG. 6 illustrates a jacket motion 625 that is generally parallel to the longitudinal axis of the fiber optic cable 100, the system of spheres 475a, 475b, 475c can absorb a variety of other movements, forces, stresses, and impacts. Rotation of the spheres 475a, 475b, 475c perpendicular to the illustrated rotations 605, 610, 615 can absorb twisting of the jacket 105 (or motion into the page), for example. Moreover, the spheres 475a, 475b, 475c can move or translate in a variety of manners, both rotationally and otherwise. For example, in response to a blow or to a crushing impact, various spheres 475a, 475b, 475c may move perpendicular and/or parallel to the axis of the fiber optic cable 100, as well as or in addition to rotating as discussed above. Thus, the system of spheres 475a, 475b, 475c can have freedom of motion that is rotational, linear, and/or translational. Such freedom of motion can comprise one, two, or three dimensions of translational motion within the fiber optic cable 100 and one, two, or three dimensions of rotational motion within the fiber optic cable 100. Accordingly, the spheres 475a, 475b, 475c can have one, two, three, or four degrees of freedom of motion.

Technology for protecting a cabled optical fiber from water and/or from physical stress has been described. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A process for protecting optical fibers of a fiber optic cable, comprising the steps of:
   providing a plurality of rounded bodies;
   adhering particles of water absorbent material to each of the plurality of rounded bodies; and
   disposing the plurality of rounded bodies and the adhering particles in the fiber optic cable,
   wherein the adhering step comprises the steps of:
      forming a slurry in response to dispersing the particles in a liquid; and
      applying the slurry to each of the plurality of rounded bodies.

2. The process of claim 1, further comprising the step of disposing air in the fiber optic cable between the plurality of rounded bodies disposed in the fiber optic cable.

3. A process for protecting optical fibers of a fiber optic cable, comprising the steps of:
    providing a plurality of rounded bodies;
    adhering particles of water absorbent material to each of the plurality of rounded bodies; and
    disposing the plurality of rounded bodies and the adhering particles in the fiber optic cable,
    wherein the adhering step comprises the steps of:
        placing the particles in a liquid;
        applying the liquid, with the particles therein, to the plurality of rounded bodies; and
        evaporating at least some of the liquid.

4. A process for protecting optical fibers of a fiber optic cable, comprising the steps of:
    providing a plurality of rounded bodies;
    adhering particles of water absorbent material to each of the plurality of rounded bodies; and
    disposing the plurality of rounded bodies and the adhering particles in the fiber optic cable;
    wherein the adhering step comprises:
        mixing the particles with a carrier;
        coating the carrier and the particles on each of the plurality of rounded bodies; and
        crosslinking the coated mixed particles.

5. The process of claim 4, wherein crosslinking the coated mixed particles comprises bonding at least one of the particles to one of the rounded bodies.

6. The process of claim 4, wherein crosslinking the coated mixed particles comprises crosslinking at least one of the particles to at least one other of the particles.

7. The process of claim 1, wherein each of the plurality of rounded bodies has a controlled diameter, and
    wherein the water absorbent material comprises super absorbent polymer.

8. The process of claim 1, wherein the disposing step comprises gravity feeding the plurality of rounded bodies into the fiber optic cable.

9. The process of claim 1, wherein the disposing step comprises air feeding the plurality of rounded bodies into the fiber optic cable.

10. A system for disposing in a fiber optic cable to protect optical fibers of the fiber optic cable, the system comprising a plurality of ball-shaped objects,
    each ball-shaped object comprising:
        a surface; and
        water absorbent material attached to the surface,
    wherein each of the optical fibers has an outer diameter, and
    wherein each ball-shaped object has a diameter that is larger than the outer diameter.

11. The system of claim 10, wherein an electrostatic force adheres the water absorbent material to the surface.

12. The system of claim 10, wherein the water absorbent material forms a shell around each ball-shaped object.

13. The system of claim 10, wherein each ball-shaped object comprises an interior region, defined by the surface, that is essentially void of the water absorbent material.

14. The system of claim 13, wherein the water absorbent material comprises a film adhering to the surface.

15. The system of claim 14, wherein the water absorbent material comprises super absorbent polymer.

16. The system of claim 10, wherein the water absorbent material attached to the surface encapsulates the surface.

17. The system of claim 10, wherein the water absorbent material is operative to absorb at least 100 times its weight in water.

18. A cable comprising:
    a tube extending along the cable and defining a cylindrical volume;
    an optical fiber disposed lengthwise in the cylindrical volume, wherein the optical fiber comprises an outer diameter; and
    a plurality of spheres disposed in the cylindrical volume,
    wherein each sphere comprises an outer region of water absorbent material and an inner region of another material, and
    wherein each sphere comprises a diameter larger than the outer diameter of the optical fiber.

19. The cable of claim 18, wherein the inner region comprises a surface to which the water absorbent material is attached.

20. The cable of claim 18, wherein a spherical surface defines an interface between the water absorbent material and the another material.

21. The cable of claim 18, wherein the water absorbent material comprises super absorbent polymer.

22. The cable of claim 18, wherein each of the spheres contacts at least one other sphere and a gas.

23. The cable of claim 18, wherein each of the spheres has at least some freedom of motion.

24. The cable of claim 18, wherein each of the spheres is essentially dry.

25. The cable of claim 18, wherein each of the spheres has a rotational degree of freedom and a translational degree of freedom.

26. The cable of claim 18, wherein the outer region comprises a film comprising super absorbent polymer.

27. The cable of claim 18, wherein the outer region comprises particles of the water absorbent material.

28. The process of claim 3, further comprising disposing air in the fiber optic cable between the plurality of rounded bodies disposed in the fiber optic cable.

29. The process of claim 3, wherein each of the plurality of rounded bodies has a controlled diameter, and
    wherein the water absorbent material comprises super absorbent polymer.

30. The process of claim 3, wherein the disposing step comprises gravity feeding the plurality of rounded bodies into the fiber optic cable.

31. The process of claim 3, wherein the disposing step comprises air feeding the plurality of rounded bodies into the fiber optic cable.

32. The process of claim 4, further comprising the step of disposing air in the fiber optic cable between the plurality of rounded bodies disposed in the fiber optic cable.

33. The process of claim 4, wherein each of the plurality of rounded bodies has a controlled diameter, and
    wherein the water absorbent material comprises super absorbent polymer.

34. The process of claim 4, wherein the disposing step comprises gravity feeding the plurality of rounded bodies into the fiber optic cable.

35. The process of claim 4, wherein the disposing step comprises air feeding the plurality of rounded bodies into the fiber optic cable.

* * * * *